United States Patent
Tang et al.

(10) Patent No.: US 11,719,237 B2
(45) Date of Patent: Aug. 8, 2023

(54) PUMPING ASSEMBLY, PISTON PUMP AND WATER FLOSSER

(71) Applicant: FLY CAT ELECTRICAL CO., LTD., Guangdong (CN)

(72) Inventors: Yong Tang, Guangdong (CN); Xiao Liu, Guangdong (CN)

(73) Assignee: FLY CAT ELECTRICAL CO., LTD., Shenzhen (CN)

( * ) Notice: Subject to any disclaimer, the term of this patent is extended or adjusted under 35 U.S.C. 154(b) by 0 days.

(21) Appl. No.: 17/975,703

(22) Filed: Oct. 28, 2022

(65) Prior Publication Data

US 2023/0145178 A1 May 11, 2023

(51) Int. Cl.
*F04B 53/14* (2006.01)
*A61C 17/028* (2006.01)
*F04B 53/16* (2006.01)

(52) U.S. Cl.
CPC .......... *F04B 53/143* (2013.01); *A61C 17/028* (2013.01); *F04B 53/144* (2013.01); *F04B 53/162* (2013.01)

(58) Field of Classification Search
CPC ...... F04B 19/22; F04B 53/143; F04B 53/144; F04B 53/162; F04B 2201/08; F16J 1/001; F16J 1/22
See application file for complete search history.

(56) References Cited

U.S. PATENT DOCUMENTS

| | | | | |
|---|---|---|---|---|
| 4,540,352 | A * | 9/1985 | Becker | F04B 53/143 |
| | | | | 92/240 |
| 4,776,260 | A * | 10/1988 | Vincze | F04B 53/146 |
| | | | | 92/162 R |
| 11,353,012 | B2 * | 6/2022 | Sun | F04B 53/10 |
| 2016/0151133 | A1 * | 6/2016 | Luettgen | F04B 53/14 |
| | | | | 417/437 |

* cited by examiner

*Primary Examiner* — Michael Leslie
(74) *Attorney, Agent, or Firm* — Brooks Kushman PC; John E. Nemazi

(57) ABSTRACT

The present disclosure relates to a pumping assembly, a piston pump and a water flosser. The pumping assembly includes: a cylinder, at least two chambers with different inner diameters being provided in the cylinder; a piston mechanism successively extending through the at least two chambers, the piston mechanism being in slidable cooperation with walls of the chambers, and a gap being formed between a sidewall of part of the piston mechanism and the walls of the chambers; and a drive mechanism connected to the piston mechanism, the drive mechanism being configured to drive the piston mechanism to move.

13 Claims, 3 Drawing Sheets

PUMPING ASSEMBLY, PISTON PUMP AND WATER FLOSSER

CROSS-REFERENCE TO RELATED APPLICATIONS

The present application claims priority to Chinese patent application No. 202122725514.1, filed on Nov. 8, 2021, the entire content of which is incorporated herein by reference.

TECHNICAL FIELD

The present disclosure relates to the field of oral cleaning technologies, and in particular, to a pumping assembly, a piston pump, and a water flosser.

BACKGROUND

A water flosser is a new oral cleaning appliance, which can clean teeth and gaps between the teeth by spraying water jets, and also has an effect of massage. Strength of a cleaning fluid pumped by the water flosser is a key factor to determine cleaning effects of the water flosser.

In the related art, the cleaning fluid is generally pumped from a water storage device such as a water tank, into an oral cavity by a hydraulic pump such as a piston pump, so as to achieve a purpose of cleaning the oral cavity.

However, when the cleaning fluid is driven by using a piston pump, a piston may be subject to greater friction resistance during movement, which may increase the load on a drive mechanism in the water flosser and reduce the battery life of the water flosser.

SUMMARY

According to various embodiments, a pumping assembly, a piston pump, and a water flosser are provided.

A pumping assembly includes:
a cylinder provided therein with at least two chambers with different inner diameters;
a piston mechanism successively extending through the at least two chambers, the piston mechanism being in slidable cooperation with walls of the chambers, and a gap being formed between a sidewall of part of the piston mechanism and the walls of the chambers; and
a drive mechanism connected to the piston mechanism, the drive mechanism being configured to drive the piston mechanism to move.

In one of the embodiments, the piston mechanism is provided with a separation groove. When the piston mechanism moves, at least part of the separation groove is located in a chamber with a larger inner diameter of the at least two chambers.

In one of the embodiments, the piston mechanism includes a piston head, and the separation groove is provided on a sidewall of the piston head. The piston head includes a mating end. At least part of the mating end is kept in sealing cooperation with a wall of a chamber with a smaller inner diameter of the at least two chambers.

In one of the embodiments, the piston mechanism further includes a connecting rod, the piston head further includes a connecting end. The connecting end is connected to the drive mechanism through the connecting rod. The connecting end and the mating end are distributed on different sides of the separation groove, and the gap is formed between a sidewall of the connecting end and the wall of the chamber a larger inner diameter of the at least two chambers.

In one of the embodiments, the separation groove is provided with a bottom wall and a sidewall connected to the bottom wall, the sidewall is arranged obliquely relative to the bottom wall.

In one of the embodiments, the at least two chambers with different inner diameters include a first accommodating cavity and a second accommodating cavity. An inner diameter of the second accommodating cavity is larger than that of the first accommodating cavity. A wall of the first accommodating cavity is in slidable cooperation with the piston mechanism, and the gap is formed between the second accommodating cavity and the sidewall of the piston mechanism.

In one of the embodiments, the at least two chambers with different inner diameters further include a flared cavity. Two ends of a wall of the flared cavity are connected to the wall of the first accommodating cavity and the wall of the second accommodating cavity respectively. an inner diameter of the flared cavity gradually increases along a direction from the first accommodating cavity to the second accommodating cavity.

In one of the embodiments, a side of the piston mechanism away from the drive mechanism is provided with an accommodating groove, and a wall of the accommodating groove is elastic.

A piston pump includes:
the pumping assembly according to any one of the above embodiments.

A water flosser includes:
the pumping assembly according to any one of the above embodiments.

In the pumping assembly, at least two chambers with different inner diameters are provided in the cylinder, and the gap is formed between the sidewall of part of the piston mechanism and the walls of the chambers. With this configuration, the contact area between the piston head and the walls of the chambers can be reduced, thereby the resistance to a piston during reciprocating movement is reduced. Moreover, since at least two chambers with different inner diameters are provided in the cylinder, the resistance encountered by the piston mechanism is reduced while ensuring the sealing performance of the piston mechanism during movement without reducing a size of the piston mechanism, which ensures the overall strength of the piston mechanism.

DETAILED DESCRIPTION OF THE EMBODIMENTS

Figure 1:
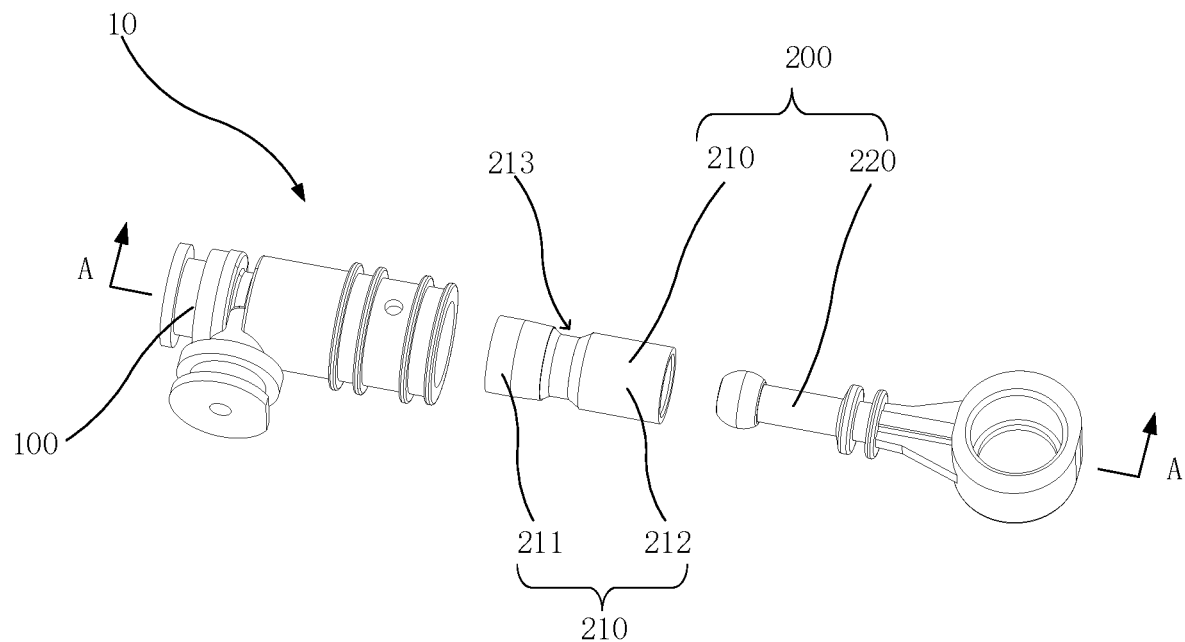
FIG. 1 is a schematic exploded view of a pumping assembly according to an embodiment.

In order to make the above objectives, features and advantages of the present disclosure more obvious and understandable, specific implementations of the present disclosure are described in detail below with reference to the accompanying drawings. In the following description, many specific details are set forth in order to fully understand the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that the orientation or position relationship indicated by the terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate the description of the present disclosure and simplify the description, rather than indicating or implying that the indicated device or element must have a particular orientation or be constructed and operated in a particular orientation, and therefore are not to be interpreted as limiting the present disclosure.

In addition, the terms "first" and "second" are used for descriptive purposes only, which cannot be construed as indicating or implying a relative importance, or implicitly specifying the number of the indicated technical features. Thus, the features defined with "first" and "second" may explicitly or implicitly include one or more of the features. In the description of the present disclosure, "a plurality of" means two or more, for example, two or three, unless specifically stated otherwise.

In the present disclosure, unless otherwise explicitly specified and defined, the terms "mount", "couple", "connect" and "fix" should be understood in a broad sense, such as, a fixed connection, a detachable connection, or an integral connection; a mechanical connection, or an electrical connection; a direct connection, an indirect connection through an intermediate medium, an internal connection between two elements, or an interaction between two elements, unless otherwise explicitly defined. For those of ordinary skill in the art, the specific meanings of the above terms in the present disclosure can be understood according to the specific situation.

In the present disclosure, unless otherwise explicitly specified and defined, a first feature being "on" or "under" a second feature may mean that the first feature is in direct contact with the second feature, or the first feature is in indirect contact with the second feature via an intermediate medium. Furthermore, the first feature being "over", "above" and "on top of" the second feature may mean that the first feature is directly above or obliquely above the second feature, or only means that the level of the first feature is higher than that of the second feature in a horizontal direction. The first feature being "below", "underneath" or "under" the second feature may mean that the first feature is directly underneath or obliquely underneath the second feature, or only means that the level of the first feature is lower than that of the second feature.

It is to be noted that, when one element is referred to as "being fixed to" or "being disposed on" another element, the element may be directly on another element or there may be an intermediate element therebetween. When one element is considered to be "connected to" another element, the element may be directly connected to another element or there may be an intermediate element therebetween. The terms "vertical", "horizontal", "up", "down", "left", "right" and similar expressions used herein are for illustrative purposes only and do not mean that they are the only means of implementation.

Figure 2:
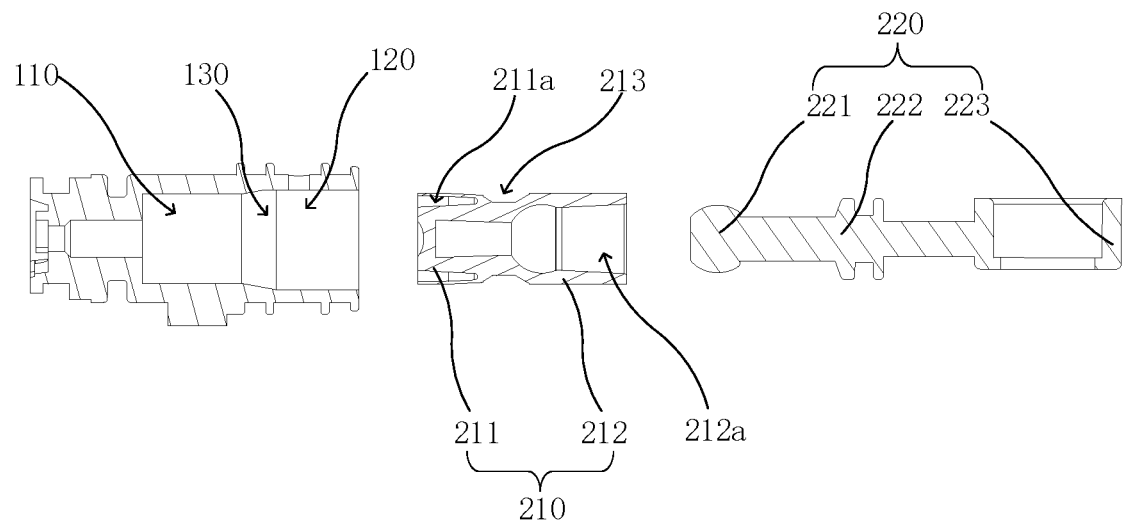
FIG. 2 is a cross-sectional view taken along a line A-A in FIG. 1.

Referring to FIG. 1, FIG. 1 is a schematic exploded view of a pumping assembly 10 according to an embodiment of the present disclosure. The pumping assembly 10 according to the embodiment of the present disclosure includes a cylinder 100, a piston mechanism 200 and a drive mechanism (not shown, same below). FIG. 2 is a cross-sectional view taken along a line A-A in FIG. 1.

At least two chambers with different inner diameters are provided in the cylinder 100. The piston mechanism 200 successively extends through the at least two chambers. The piston mechanism 200 is in slidable cooperation with walls of the chambers, and a gap is formed between a sidewall of part of the piston mechanism 200 and the walls of the chambers. The drive mechanism is connected to the piston mechanism 200. The drive mechanism is configured to drive the piston mechanism 200 to move. Driven by the drive mechanism, the piston mechanism 200 is in slidable cooperation with the walls of the chambers to realize a pumping function.

Figure 4:
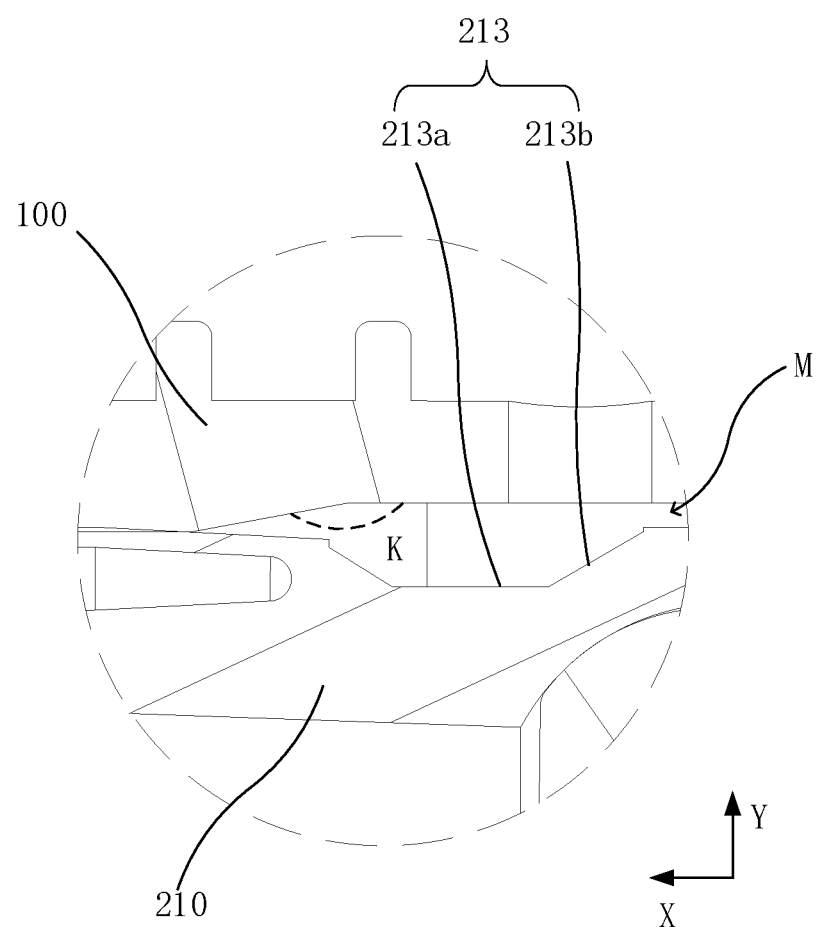
FIG. 4 is a partial enlarged view of a portion B in FIG. 3.
In the drawings, the reference numerals as following:
10: pumping assembly; 100: cylinder; 110: first accommodating cavity; 120: second accommodating cavity; 130: flared cavity; 200: piston mechanism; 210: piston head; 211: mating end; 211a: accommodating groove; 212: connecting end; 212a: engaging groove; 213: separation groove; 213a: bottom wall; 213b: sidewall; 220: connecting rod; 221: engagement body; 222: rod body; 223: drive portion; K: included angle; M: gap.

In the pumping assembly 10, at least two chambers with different inner diameters are provided in the cylinder 100, and the gap is formed between the sidewall of part of the piston mechanism 200 and the walls of the chambers. With this configuration, a contact area between the piston mechanism 200 and the walls of the chambers is reduced. Thereby the resistance during reciprocating movement of the piston mechanism 200 is reduced. In this way, the load on the drive mechanism is reduced, which facilitates the drive mechanism to drive the piston mechanism 200 and reduces power consumption of the piston mechanism 200. The gap is shown in FIG. 4 and is indicated by the arrow M.

Moreover, at least two chambers with different inner diameters are provided in the cylinder 100. As such, the resistance encountered by the piston mechanism 200 is reduced, while ensuring sealing performance of the piston mechanism 200 during movement without reducing a size of the piston mechanism 200, which ensures the overall strength of the piston mechanism 200.

Referring to FIG. 2, in an embodiment, the piston mechanism 200 is provided with a separation groove 213. When the piston mechanism 200 moves, the separation groove 213 is at least partially located in the chamber with a larger inner diameter of the at least two chambers. The piston mechanism 200 can reciprocates in the cylinder 100. Since the at least two chambers with different inner diameters are provided in the cylinder 100, and when the piston mechanism 200 moves, at least part of the separation groove 213 is located in the chamber with a larger inner diameter of the at least two chambers, the contact area between the piston mechanism 200 and the wall of the chamber is reduced, thereby reducing the friction force to the piston mechanism 200 during the reciprocating movement and facilitating the reciprocating movement of the piston mechanism 200.

Figure 3:
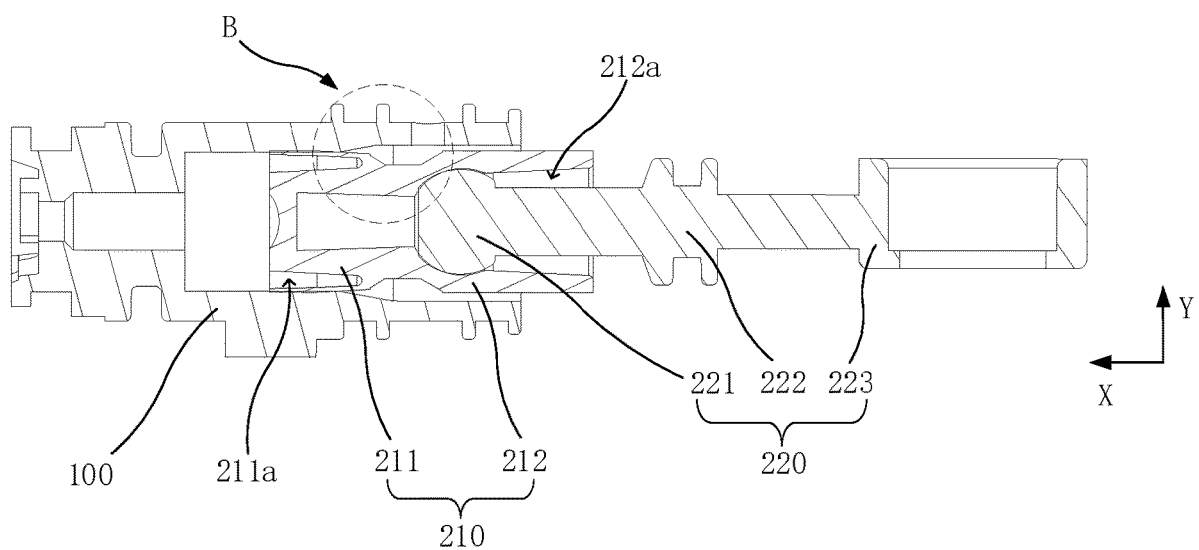
FIG. 3 is a cross-sectional view of the pumping assembly shown in FIG. 2.

Referring to FIG. 3, in an embodiment, the piston mechanism 200 includes a piston head 210. The separation groove 213 is disposed on a sidewall of the piston head 210. The piston head 210 includes a mating end 211. At least part of the mating end 211 is kept to be in sealing cooperation with the wall of the chamber with a smaller inner diameter of the at least two chambers. In other words, when the piston head 210 moves, the mating end 211 of the piston head 210 is always kept to be in sealing cooperation with the wall of the chamber with a smaller inner diameter of the at least two chambers. In this way, the sealing performance of the piston head 210 during the reciprocating movement is ensured, which prevents reduction of the sealing performance of the piston mechanism 200 due to the reduction of the contact area between the piston head 210 and the wall of the chamber in the cylinder 100.

Referring to FIG. 3, in an embodiment, the piston mechanism 200 further includes a connecting rod 220. The piston head 210 further includes a connecting end 212. The connecting end 212 is connected to the drive mechanism through the connecting rod 220. The connecting end 212 and the mating end 211 are distributed at two sides of the separation groove 213. The gap is formed between a sidewall of the connecting end 212 and the walls of the chambers. Specifically, during the reciprocating movement of the piston mechanism 200 in the chamber, the mating end 211 is always kept to be in sealing cooperation with the wall of the chamber with a smaller inner diameter of the at least two chambers, so as to ensure the sealing performance of the piston head 210 during the reciprocating movement. As such, it is possible to prevent the leakage of formed positive pressure and negative pressure to affect a pumping effect of the pumping assembly 10.

When the piston mechanism 200 reciprocates, the gap is formed between the sidewall of at least part of the connecting end 212 and the wall of the chamber with a larger inner diameter of the at least two chambers. It can be understood that, when the piston mechanism 200 reciprocates, the connecting end 212 may be always located in the chamber with a larger inner diameter. In this way, when the piston mechanism 200 moves, the gap is always formed between the connecting end 212 and the wall of the chamber, so as to further reduce the contact area between the piston head 210 and the cylinder 100, which further reduces the resistance encountered by the piston mechanism 200 during the reciprocating movement, therefore the piston mechanism 200 is easy to be driven to move.

Further, referring to FIG. 2, the connecting end 212 is connected to the drive mechanism through the connecting rod 220. That is, the connecting rod 220 transfers motion of the drive mechanism to the piston head 210 through the connecting end 212, so as to realize the reciprocating movement of the piston head 210. In an embodiment, specifically, the connecting rod 220 includes a rod body 222, an engagement body 221 and a drive portion 223. The drive portion 223 and the engagement body 221 are provided at two ends of the rod body 222. The drive portion 223 is configured to be connected to the drive mechanism to transfer the motion of the drive mechanism to the piston head 210. One side of the connecting end 212 adjacent to the drive mechanism is provided with an engaging groove 212a. A shape of a sidewall of the engaging groove 212a matches the engagement body 221. The engagement body 221 is engaged with the engaging groove 212 to drive the piston head 210 to move.

In the above embodiments, since the connecting end 212 is always located in the chamber with a larger inner diameter, the inner diameter of the chamber with a larger inner diameter may be reasonably adjusted to ensure that the connecting end 212 has a sufficient thickness. Referring to FIG. 3, the thickness of the connecting end 212 refers to a distance from a wall of the engaging groove 212a to an outer wall of the connecting end 212 in a Y direction. In this way, the connecting end 212 has certain structural strength, so that a transmission connection relationship between the engaging groove 212a and the engagement body 221 is more stable, thereby preventing the connecting rod 220 from being separated from the piston head 210.

Referring to FIG. 4 and FIG. 3, in an embodiment, the separation groove 213 is provided with a bottom wall 213a and a sidewall 213b connected to the bottom wall 213a. The sidewall 213b is arranged obliquely relative to the bottom wall 213a. It can be understood that the separation groove 213 includes the bottom wall 213a and sidewalls 213b connected to two opposite sides of the bottom wall 213a. The two opposite sidewalls 213b are both arranged obliquely relative to the bottom wall 213a. In other embodiments, only one sidewall 213b is arranged obliquely relative to the bottom wall 213a according to actual requirements. The two sides include one side of the bottom wall 213a adjacent to the mating end 211 and one side adjacent to the connecting end 212.

In this way, compared with the case where the sidewall 213b and the bottom wall 213a of the separation groove 213 are perpendicular to each other, the case where the sidewall 213b is arranged obliquely relative to the bottom wall 213a ensures thicknesses of the connecting end 212 and the mating end 211 as much as possible on the basis of reducing the contact area between the piston head 210 and the cylinder 100, the structural strength of the piston head 210 is enhanced. It is possible to prevent damages to the connecting end 212 and the mating end 211 caused by compression during the reciprocating movement of the piston mechanism 200. Moreover, as described above, the increase in the thickness of the connecting end 212 ensures strength of the connection to the connecting rod 220, thereby ensuring stable connection between the connecting rod 220 and the piston head 210.

Referring to FIG. 4, in an embodiment, a depth of the separation groove 213 is ⅛ to ½ of a width of the separation groove 213. It should be understood that a ratio of the depth of the separation groove 213 to the width of the separation groove 213 is reasonably set according to requirements of different output strength or different driving manners. Referring to the coordinate system in the figure, the depth of the separation groove 213 is a dimension of the separation groove 213 in the Y direction, and the width of the separation groove 213 is a dimension of the separation groove 213 in an X direction.

Referring to FIG. 2 and FIG. 3, in an embodiment, the at least two chambers with different inner diameters include a first accommodating cavity 110 and a second accommodating cavity 120, an inner diameter of the second accommodating cavity 120 is larger than that of the first accommodating cavity 110. A wall of the first accommodating cavity 110 is in slidable cooperation with the piston mechanism 200, and the gap is formed between the second accommodating cavity 120 and the sidewall of the piston mechanism 200. Specifically, the mating end 211 movably extends through the first accommodating cavity 110, and at least part of the mating end 211 is kept in slidable cooperation with the wall of the first accommodating cavity 110. In this way, through the slidable cooperation relationship between the mating end 211 and the wall of the first accommodating cavity 110, the sealing performance of the cylinder 100 during the reciprocating movement of the piston mechanism 200 is ensured, and leakage of the pressure is avoided.

The connecting end 212 movably extends through the second accommodating cavity 120, and the gap is formed between the connecting end 212 and the wall of the second accommodating cavity 120. In this way, the friction between the wall of the second accommodating cavity 120 and the connecting end 212 during the sliding of the piston mechanism 200 is avoided. Thus, the friction resistance encountered by the piston mechanism 200 during the reciprocating movement is reduced. In this way, the load to the drive mechanism is reduced, which facilitates the drive mechanism to drive the piston mechanism 200, and thus which reduces the power consumption of the piston mechanism 200.

That is, in the above embodiments, referring to FIG. 3 and FIG. 4, the sidewall 213b of the piston head 210 is provided with the separation groove 213. The piston head 210 includes the mating end 211 and the connecting end 212, and the mating end 211 and the connecting end 212 are located on two sides of the separation groove 213 on the piston head 210 respectively. The mating end 211 is configured to be in slidable cooperation with the chamber in the cylinder 100, so as to realize the pumping function of the piston head 210. The connecting end 212 is configured to be connected to the connecting rod 220, so as to transfer the driving action of the drive mechanism to the piston head 210 through the connecting rod 220, to realize the reciprocating movement of the piston head 210.

Moreover, a diameter of the mating end 211 may be the same as an inner diameter of the first accommodating cavity 110, and along the X-axis direction, diameters of the mating end 211 are the same everywhere. That is, the mating end 211 has a substantially cylindrical contour, so that it is more beneficial to be kept in slidable cooperation with the wall of the first accommodating cavity 110, thereby ensuring the sealing performance of the piston head 210 during the reciprocating movement. In an embodiment, a diameter of the connecting end 212 is the same as that of the mating end 211, in other embodiment, the diameter of the connecting end 212 is slightly greater than that of the mating end 211, so as to ensure the thickness of the wall of the engaging groove 212a, and ensure stability of connection between the piston head 210 and the connecting rod 220. In addition, referring to FIG. 3, diameters of the connecting end 212 are the same everywhere along the X-axis direction, so that the thickness of the wall of the engaging groove 212a is uniform, thereby ensuring the stable connection transmission relationship between the piston head 210 and the connecting rod 220.

Referring to FIG. 2, it can be understood that the piston head 210 successively includes a straight cylinder section, a diameter reducing section, a straight cylinder section, a diameter increasing section, and a straight cylinder section in a direction from the mating end 211 to the connecting end 212.

Referring to FIG. 3 and FIG. 4, in an embodiment, the at least two chambers with different inner diameters further include a flared cavity 130. Walls of the flared cavity 130 at two ends are connected to the wall of the first accommodating cavity 110 and the wall of the second accommodating cavity 120 respectively. Along a direction from the first accommodating cavity 110 to the second accommodating cavity 120, an inner diameter of the flared cavity 130 gradually increases. The flared cavity 130 with a gradually increasing inner diameter is provided between the wall of the first accommodating cavity 110 and the wall of the second accommodating cavity 120, on the one hand, which further reduces the contact area between the cylinder 100 and the piston mechanism 200, the resistance to the reciprocating movement of the piston mechanism 200 is reduced. On the other hand, as the inner diameter of the flared cavity 130 gradually increases, the wall of the flared cavity 130 enables the mating end 211 to be easily inserted into the first accommodating cavity 110, facilitating the mounting of the piston head 210.

Referring to FIG. 4, in an embodiment, an included angle formed between the wall of the flared cavity 130 and the wall of the second accommodating cavity 120 is specifically in a range from 90° to 170°. The included angle shown in FIG. 4 is indicated by a reference numeral K.

Referring to FIG. 3 and FIG. 4, in an embodiment, a side of the piston mechanism 200 away from the drive mechanism is provided with an accommodating groove 211a. A wall of the accommodating groove 211a is elastic. One end of the piston mechanism 200 away from the drive mechanism is an end for driving the water to move, that is, the end used to contact the water. Referring to FIG. 3, when the piston mechanism 200 moves toward a positive direction of the X-axis direction, the positive pressure is formed in the chamber with a smaller inner diameter. That is, a liquid with higher pressure is formed. The liquid with higher pressure enter the accommodating groove 211a. Since the wall of the accommodating groove 211a is elastic, the wall of the accommodating groove 211a is attached more closely to the wall of the chamber under the action of the liquid with higher pressure. In this way, the sealing performance of the piston mechanism 200 during the sliding is improved.

Further, when the liquid with higher pressure in the chamber with a smaller inner diameter is driven by the piston mechanism 200 to flow out of the chamber, the pressure of the liquid with higher pressure is decreased. In this case, since the wall of the accommodating groove 211a is elastic, the wall of the accommodating groove 211a has elastic restoring force. Thus, the liquid in the accommodating groove 211a flows out under the elastic restoring force, which forms "secondary pumping". That is, the liquid in the accommodating groove 211a has a stable outlet pressure, and an excessively rapid decrease in the outlet pressure is avoided, thereby improving the pumping effect.

Still referring to FIG. 3 and FIG. 4, in an embodiment, the accommodating groove 211a is provided on the sidewall of the piston mechanism 200 in a ring shape. In this way, the walls of the ring-shaped accommodating groove 211a is pressed against the wall of the chamber tightly under the action of the liquid, so as to further improve the sealing performance of the piston mechanism 200 during the reciprocating movement.

Specifically, the accommodating groove 211a is provided on a side surface of the mating end 211 away from the connecting end 212.

In an embodiment, a piston pump (not shown) includes the pumping assembly 10 according to the above embodiments, as such, the piston pump is driven more labor-saving. A device adopting the piston pump saves the energy required to drive the piston mechanism 200, thereby reducing the energy consumption of the piston mechanism 200.

In one embodiment, a water flosser (not shown) includes the pumping assembly 10 according to the above embodiments. As such, the water flosser has lower energy consumption, so that the battery life of the water flosser is improved.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make changes and improvements without departing from the conception of the present disclosure, all of which fall within the protection scope of the present disclosure. Therefore, the patent protection scope of the present disclosure should be subject to the appended claims.

What is claimed is:

1. A pumping assembly, comprising:
a cylinder, provided therein with at least two chambers with different inner diameters;
a piston mechanism, comprising a piston head and a separation groove provided on a sidewall of the piston head, wherein the piston head comprises a mating end and a connecting end that are successively extending through the at least two chambers, the mating end is in sealing cooperation with a wall of a chamber with a smaller inner diameter of the at least two chambers, and a gap being formed between a sidewall of the connecting end and a wall of a chamber with a larger inner diameter of the at least two chambers, the separation groove is provided with a bottom wall and a sidewall connected to the bottom wall;
the sidewall is arranged obliquely relative to the bottom wall, and a depth of the separation groove is $\frac{1}{8}$ to $\frac{1}{2}$ of a width of the separation groove; and
a drive mechanism connected to the piston mechanism, the drive mechanism being configured to drive the piston mechanism to move;
wherein a side of the mating end away from the drive mechanism is provided with an accommodating groove, and a wall of the accommodating groove is elastic.

2. The pumping assembly according to claim 1, wherein when the piston mechanism moves, at least part of the separation groove is located in a chamber with a larger inner diameter of the at least two chambers.

3. The pumping assembly according to claim 1, wherein the piston mechanism further comprises a connecting rod; the connecting end is connected to the drive mechanism through the connecting rod; the connecting end and the mating end are distributed on two sides of the separation groove.

4. The pumping assembly according to claim 1, wherein the at least two chambers with different inner diameters comprise a first accommodating cavity and a second accommodating cavity; an inner diameter of the second accommodating cavity is larger than that of the first accommodating cavity; a wall of the first accommodating cavity is in slidable cooperation with the piston mechanism; and the gap is formed between the second accommodating cavity and the sidewall of the piston mechanism.

5. The pumping assembly according to claim 4, wherein the at least two chambers with different inner diameters further comprise a flared cavity; two ends of a wall of the flared cavity are connected to the wall of the first accommodating cavity and a wall of the second accommodating cavity respectively; and an inner diameter of the flared cavity increases along a direction from the first accommodating cavity to the second accommodating cavity.

6. A piston pump, comprising:
a pumping assembly, comprising:
a cylinder, provided therein with at least two chambers with different inner diameters;
a piston mechanism, comprising a piston head and a separation groove provided on a sidewall of the piston head, wherein the piston head comprises a mating end and a connecting end that are successively extending through the at least two chambers, the mating end is in sealing cooperation with a wall of a chamber with a smaller inner diameter of the at least two chambers, and a gap being formed between a sidewall of the connecting end and a wall of a chamber with a larger inner diameter of the at least two chambers, the separation groove is provided with a bottom wall and a sidewall connected to the bottom wall;
the sidewall is arranged obliquely relative to the bottom wall, and a depth of the separation groove is $\frac{1}{8}$ to $\frac{1}{2}$ of a width of the separation groove; and
a drive mechanism connected to the piston mechanism, the drive mechanism being configured to drive the piston mechanism to move;
wherein a side of the mating end away from the drive mechanism is provided with an accommodating groove, and a wall of the accommodating groove is elastic.

7. The piston pump according to claim 6, wherein when the piston mechanism moves, at least part of the separation groove is located in a chamber with a larger inner diameter of the at least two chambers.

8. The piston pump according to claim 6, wherein the piston mechanism further comprises a connecting rod; the connecting end is connected to the drive mechanism through the connecting rod; the connecting end and the mating end are distributed on two sides of the separation groove.

9. The piston pump according to claim 6, wherein the at least two chambers with different inner diameters comprise a first accommodating cavity and a second accommodating cavity; an inner diameter of the second accommodating cavity is larger than that of the first accommodating cavity; a wall of the first accommodating cavity is in slidable cooperation with the piston mechanism; and the gap is formed between the second accommodating cavity and the sidewall of the piston mechanism.

10. The piston pump according to claim 9, wherein the at least two chambers with different inner diameters further comprise a flared cavity; two ends of a wall of the flared cavity are connected to the wall of the first accommodating cavity and a wall of the second accommodating cavity respectively; and an inner diameter of the flared cavity increases along a direction from the first accommodating cavity to the second accommodating cavity.

11. A water flosser, comprising:
a pumping assembly, comprising:
a cylinder, provided therein with at least two chambers with different inner diameters;
a piston mechanism, comprising a piston head and a separation groove provided on a sidewall of the piston head, wherein the piston head comprises a mating end and a connecting end that are successively extending through the at least two chambers, the mating end is in sealing cooperation with a wall of a chamber with a smaller inner diameter of the at least two chambers, and a gap being formed between a sidewall of the connecting end and a wall of a chamber with a larger inner diameter of the at least two chambers, the separation groove is provided with a bottom wall and a sidewall connected to the bottom wall;
the sidewall is arranged obliquely relative to the bottom wall, and a depth of the separation groove is $\frac{1}{8}$ to $\frac{1}{2}$ of a width of the separation groove; and a drive mechanism connected to the piston mechanism, the drive mechanism being configured to drive the piston mechanism to move;

wherein a side of the mating end away from the drive mechanism is provided with an accommodating groove, and a wall of the accommodating groove is elastic.

12. The water flosser according to claim 11, wherein when the piston mechanism moves, at least part of the separation groove is located in a chamber with a larger inner diameter of the at least two chambers.

13. The water flosser according to claim 11, wherein the piston mechanism further comprises a connecting rod; the connecting end is connected to the drive mechanism through the connecting rod; the connecting end and the mating end are distributed on two sides of the separation groove.

* * * * *